United States Patent [19]
Coleman

[11] Patent Number: 5,966,819
[45] Date of Patent: Oct. 19, 1999

[54] MEAT SCRAPING TOOL

[76] Inventor: David R. Coleman, 8824 Flying Hawk Ct., Elk Grove, Calif. 95624

[21] Appl. No.: 09/015,210

[22] Filed: Jan. 29, 1998

[51] Int. Cl.$^6$ ................................................ A22C 17/04
[52] U.S. Cl. ........................... 30/172; 30/130; 30/279.2; 30/301
[58] Field of Search ............................ 30/301, 299, 321, 30/279.2, 283, 169, 128, 130, 172; 452/104, 102, 105, 6, 17; 15/236.06

[56] References Cited

U.S. PATENT DOCUMENTS

| 135,699 | 2/1873 | Davis | 30/169 |
| 2,449,092 | 9/1948 | Struble | 15/236.06 |
| 3,091,791 | 6/1963 | Czapar | 15/245 |
| 3,699,604 | 10/1972 | Hunt | 15/236.06 |

Primary Examiner—Rinaldi I. Rada
Assistant Examiner—Dominic J. Troiano

[57] ABSTRACT

A new meat scraping tool for easily dislodging meat by pressing a button. The inventive device includes a handle. A plurality of generally cylindrical stationary blade members arranged in a concentric configuration are included. The stationary blade members have coextensive end portions extending inwardly of an end of the handle. The stationary blade members each have a blunt upper edge and a sharp lower edge. A plurality of generally cylindrical pivoting blade members each are positioned in an abutting relationship with an interior surface of respective stationary blade members. The pivoting blade members have coextensive end portions extending inwardly of the end of the handle. The pivoting blade members each have a blunt upper edge and a sharp lower edge. The pivoting blade members are pivotable with respect to the stationary blade members.

4 Claims, 2 Drawing Sheets

MEAT SCRAPING TOOL

BACKGROUND OF THE INVENTION

1. Field of the Invention

The present invention relates to meat cutting tools and more particularly pertains to a new meat scraping tool for easily dislodging meat by pressing a button.

2. Description of the Prior Art

The use of meat cutting tools is known in the prior art. More specifically, meat cutting tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art meat cutting tools include U.S. Pat. No. 4,023,271 to Di Franco; U.S. Pat. No. 3,955,234 to Roefaro; U.S. Pat. No. 4,161,381 to Sciortino; U.S. Pat. No. 4,392,806 to Houle; U.S. Pat. No. 4,699,582 to Chen; and U.S. Pat. No. Des. 326,324 to Iida.

While these devices fulfill their respective, particular objectives and requirements, the aforementioned patents do not disclose a new meat scraping tool. The inventive device includes a handle. A plurality of generally cylindrical stationary blade members arranged in a concentric configuration are included. The stationary blade members have coextensive end portions extending inwardly of an end of the handle. The stationary blade members each have a blunt upper edge and a sharp lower edge. A plurality of generally cylindrical pivoting blade members each are positioned in an abutting relationship with an interior surface of respective stationary blade members. The pivoting blade members have coextensive end portions extending inwardly of the end of the handle. The pivoting blade members each have a blunt upper edge and a sharp lower edge. The pivoting blade members are pivotable with respect to the stationary blade members.

In these respects, the meat scraping tool according to the present invention substantially departs from the conventional concepts and designs of the prior art, and in so doing provides an apparatus primarily developed for the purpose of easily dislodging meat by pressing a button.

SUMMARY OF THE INVENTION

In view of the foregoing disadvantages inherent in the known types of meat cutting tools now present in the prior art, the present invention provides a new meat scraping tool construction wherein the same can be utilized for easily dislodging meat by pressing a button.

The general purpose of the present invention, which will be described subsequently in greater detail, is to provide a new meat scraping tool apparatus and method which has many of the advantages of the meat cutting tools mentioned heretofore and many novel features that result in a new meat scraping tool which is not anticipated, rendered obvious, suggested, or even implied by any of the prior art meat cutting tools, either alone or in any combination thereof.

To attain this, the present invention generally comprises a handle having a generally rectangular configuration. The handle has an inner end and an outer end. The inner end has an end recess extending inwardly thereof. The handle further includes a top recess extending through an upper surface thereof into communication with the end recess. The outer end of the handle has a protuberance on a side edge thereof. Three generally cylindrical stationary blade members are included and are arranged in a concentric configuration. The stationary blade members have coextensive end portions extending inwardly of the end recess of the handle. The end portions are secured within the end recess by a retaining bolt. The stationary blade members each have a blunt upper edge and a sharp lower edge. Three generally cylindrical pivoting blade members are included with each being positioned in an abutting relationship with an interior surface of respective stationary blade members. The pivoting blade members have coextensive end portions extending inwardly of the end recess of the handle. The end portions of the pivoting blade members are coupled within the end recess by a pivot pin. The pivoting blade members each have a blunt upper edge and a sharp lower edge. A trigger mechanism is disposed within the top recess of the handle. The trigger mechanism includes a button slidably disposed within the top recess. The button has a spring extending downwardly from a lower surface thereof. A free end of the spring is secured to a lower recessed end of the top recess. The button has an arm portion extending laterally therefrom for coupling with the coextensive end portions of the pivoting blade members whereby pressing downwardly on the button facilitates upward raising of the pivoting blade members with respect to the stationary members.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new meat scraping tool apparatus and method which has many of the advantages of the meat cutting tools mentioned heretofore and many novel features that result in a new meat scraping tool which is not anticipated, rendered obvious, suggested, or even implied by any of the prior art meat cutting tools, either alone or in any combination thereof.

It is another object of the present invention to provide a new meat scraping tool which may be easily and efficiently manufactured and marketed.

It is a further object of the present invention to provide a new meat scraping tool which is of a durable and reliable construction.

An even further object of the present invention is to provide a new meat scraping tool which is susceptible of a low cost of manufacture with regard to both materials and labor, and which accordingly is then susceptible of low prices of sale to the consuming public, thereby making such meat scraping tool economically available to the buying public.

Still yet another object of the present invention is to provide a new meat scraping tool which provides in the apparatuses and methods of the prior art some of the advantages thereof, while simultaneously overcoming some of the disadvantages normally associated therewith.

Still another object of the present invention is to provide a new meat scraping tool for easily dislodging meat by pressing a button.

Yet another object of the present invention is to provide a new meat scraping tool which includes a handle. A plurality of generally cylindrical stationary blade members arranged in a concentric configuration are included. The stationary blade members have coextensive end portions extending inwardly of an end of the handle. The stationary blade members each have a blunt upper edge and a sharp lower edge. A plurality of generally cylindrical pivoting blade members each are positioned in an abutting relationship with an interior surface of respective stationary blade members. The pivoting blade members have coextensive end portions extending inwardly of the end of the handle. The pivoting blade members each have a blunt upper edge and a sharp lower edge. The pivoting blade members are pivotable with respect to the stationary blade members.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
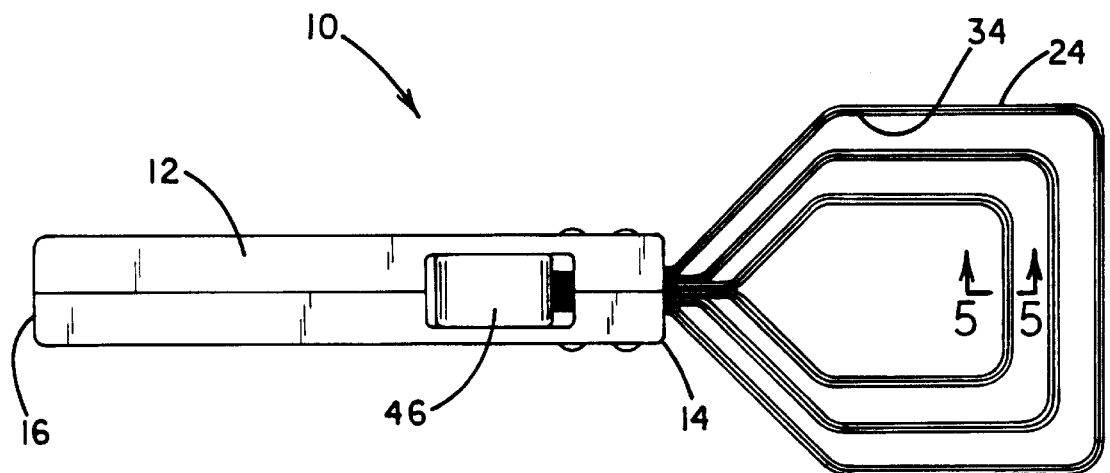
FIG. 1 is a top plan view of a new meat scraping tool according to the present invention.
Figure 2:
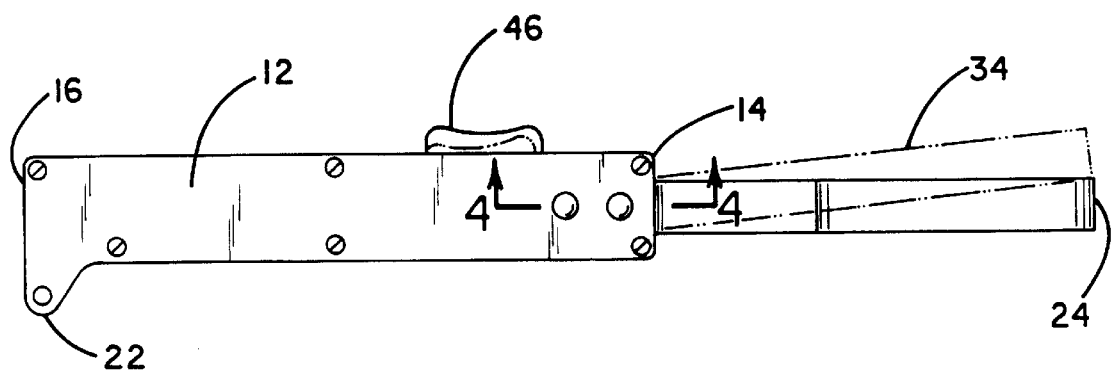
FIG. 2 is a side elevation view of the present invention.
Figure 3:
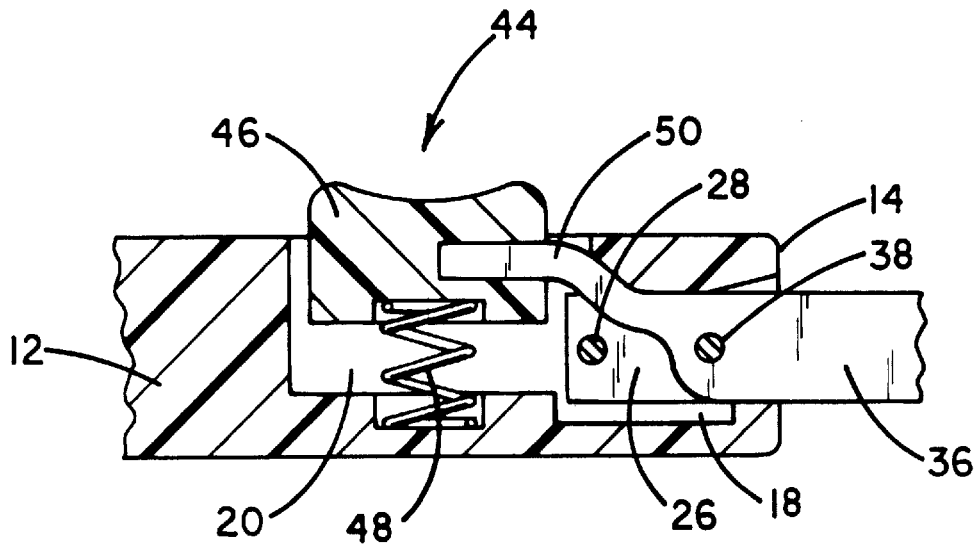
FIG. 3 is a cross-sectional view of the trigger mechanism of the present invention.
Figure 4:
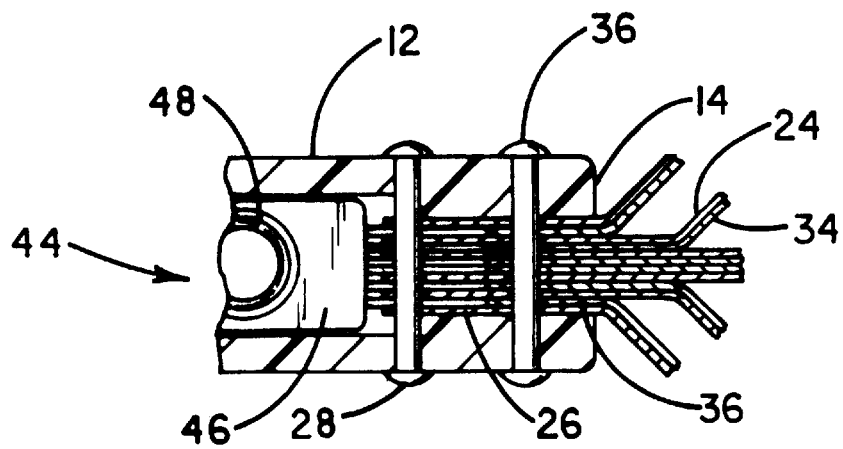
FIG. 4 is a cross-sectional view of the present invention as taken along line 4—4 of FIG. 2.
Figure 5:
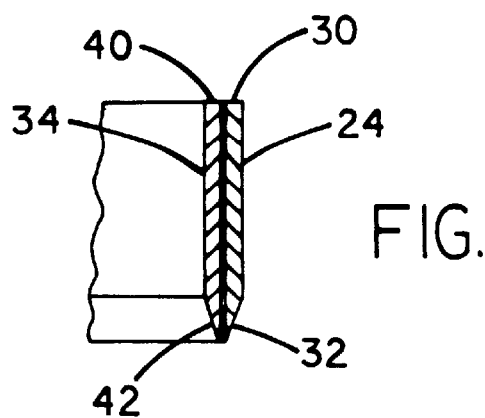
FIG. 5 is a cross-sectional view of the present invention as taken along line 5—5 of FIG. 1.

With reference now to the drawings, and in particular to FIGS. 1 through 5 thereof, a new meat scraping tool embodying the principles and concepts of the present invention and generally designated by the reference numeral 10 will be described.

As best illustrated in FIGS. 1 through 5, the meat scraping tool 10 comprises a handle 12 having a generally rectangular configuration. The handle 12 has an inner end 14 and an outer end 16. The inner end 14 has an end recess 18 extending inwardly thereof. The handle 12 further includes a top recess 20 extending through an upper surface thereof into communication with the end recess 18. The outer end 16 of the handle 12 has a protuberance 22 on a side edge thereof. The protuberance 22 serves to engage the back of a user's hand while holding the handle 12. The handle 12 could be further provided with a knurled surface of indentations to further improve the handling of the device 10.

Three generally cylindrical stationary blade members 24 are included and are arranged in a concentric configuration. The stationary blade members 24 have coextensive end portions 26 extending inwardly of the end recess 18 of the handle 12. The end portions 26 are secured within the end recess 18 by a retaining bolt 28. The stationary blade members 24 each have a blunt upper edge 30 and a sharp lower edge 32.

Three generally cylindrical pivoting blade members 34 are included with each being positioned in an abutting relationship with an interior surface of respective stationary blade members 24. The pivoting blade members 34 have coextensive end portions 36 extending inwardly of the end recess 18 of the handle 20. The end portions 36 of the pivoting blade members 34 are coupled within the end recess 18 by a pivot pin 38. The pivoting blade members 34 each have a blunt upper edge 40 and a sharp lower edge 42.

A trigger mechanism 44 is disposed within the top recess 20 of the handle 12. The trigger mechanism 44 includes a button 46 slidably disposed within the top recess 20. The button 46 has a spring 48 extending downwardly from a recessed lower surface thereof. A free end of the spring 48 is secured to a lower recessed end of the top recess 20. The button 46 has an arm portion 50 extending laterally therefrom for coupling with the coextensive end portions 36 of the pivoting blade members 34 whereby pressing downwardly on the button 46 facilitates upward raising of the pivoting blade members 34 with respect to the stationary members 24.

In use, the device 10 would be used normally for scraping and cleaning meat. The sharp lower edges 32,42 of the blades 24,34 are scraped against the meat in level and easy strokes thereby removing incremental layers from the meat. Once the blades 24,34 become encumbered with excess meat scraps the button 46 is pressed thereby causing the pivoting blade members 34 to lift upwardly to aid in their removal from the device 10. Ordinarily, this task would be accomplished by tapping the blade members 24,34 against a side of a garbage can or another unsanitary surface. The present invention allows from the removal of meat scrapings at the pressing of a button 46.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new meat scraping tool for easily dislodging meat by pressing a button comprising, in combination:

a handle having a generally rectangular configuration, the handle having an inner end and an outer end, the inner end having an end recess extending inwardly thereof, the handle further including a top recess extending through an upper surface thereof into communication with the end recess, the outer end of the handle having a protuberance of a side edge thereof;

three generally cylindrical stationary blade members arranged in a concentric configuration, the stationary blade members having coextensive end portions extending inwardly of the end recess of the handle, the end portions being secured within the end recess by a retaining bolt, the stationary blade members each having a blunt upper edge and a sharp lower edge;

three generally cylindrical pivoting blade members each being positioned in an abutting relationship with an interior surface of respective stationary blade members, the pivoting blade members having coextensive end portions extending inwardly of the end recess of the handle, the end portions of the pivoting blade members being coupled within the end recess by a pivot pin, the pivoting blade members each having a blunt upper edge and a sharp lower edge; and a trigger mechanism disposed within the top recess of the handle, the trigger mechanism including a button slidably disposed within the top recess, the button having a spring extending downwardly from a recessed lower surface thereof, a free end of the spring secured to a lower recessed end of the top recess, the button having an arm portion extending laterally therefrom for coupling with the coextensive end portions of the pivoting blade members whereby pressing downwardly on the button facilitates upward raising of the pivoting blade members with respect to the stationary members.

2. A new meat scraping tool for easily dislodging meat by pressing a button comprising, in combination:

a handle;

a plurality of generally cylindrical stationary blade members arranged in a concentric configuration, the stationary blade members having coextensive end portions extending inwardly of an end of the handle, the stationary blade members each having a blunt upper edge and a sharp lower edge; and a plurality of generally cylindrical pivoting blade members each being positioned in an abutting relationship with an interior surface of respective stationary blade members, the pivoting blade members having coextensive end portions extending inwardly of the end of the handle, the pivoting blade members each having a blunt upper edge and a sharp lower edge, the pivoting blade members being pivotable with respect to the stationary blade members.

3. The meat scraping tool as set forth in claim 2 and further including a trigger mechanism disposed within the handle whereby pressing downwardly on the trigger mechanism facilitates upward raising of the pivoting blade members with respect to the stationary members.

4. The meat scraping tool as set forth in claim 3 wherein the trigger mechanism includes a button slidably disposed within a top of the handle, the button having a spring extending downwardly from a recessed lower surface thereof, a free end of the spring secured inwardly of the handle, the button having an arm portion extending laterally therefrom for coupling with the coextensive end portions of the pivoting blade members.

* * * * *